United States Patent [19]

Evanshen

[11] 3,757,489

[45] Sept. 11, 1973

[54] POLLUTION CONTROL

[75] Inventor: John Evanshen, Montreal, Quebec, Canada

[73] Assignee: Teep Toxic Control Ltd., Montreal, Quebec, Canada

[22] Filed: Dec. 4, 1970

[21] Appl. No.: 95,016

[52] U.S. Cl.............................. 55/74, 55/97, 55/387, 55/522, 55/DIG. 30, 60/311, 423/213
[51] Int. Cl............................................. B01d 53/04
[58] Field of Search ................. 55/74, 97, 387, 524, 55/DIG. 30, DIG. 33, DIG. 24, 522; 23/2 S, 2 E; 60/300–302, 311; 423/212–213

[56] References Cited
UNITED STATES PATENTS

| 1,422,211 | 7/1922 | Lamb | 55/DIG. 33 |
|---|---|---|---|
| 1,559,980 | 11/1925 | Perrott et al. | 55/DIG. 33 |
| 1,843,999 | 2/1932 | White | 55/DIG. 30 |
| 2,071,119 | 2/1937 | Harger | 55/DIG. 30 |
| 2,122,514 | 7/1938 | Crocker | 55/524 |
| 2,197,004 | 4/1940 | Myers | 55/DIG. 24 |
| 2,579,984 | 12/1951 | Trowbridge | 55/DIG. 24 |
| 2,751,039 | 6/1956 | Hanly | 55/524 |
| 3,162,516 | 12/1964 | Dwyer | 55/DIG. 30 |
| 3,383,854 | 5/1968 | White | 55/DIG. 30 |
| 3,477,826 | 11/1969 | Moyer et al. | 55/DIG. 30 |
| 3,678,657 | 7/1972 | Hale | 55/DIG. 24 |

OTHER PUBLICATIONS

The Condensed Chemical Dictionary, Sixth Edition, Reinhold Pub. Co., N.Y., (1961), Q 5, C5 1961 C.15, p. 922.

Primary Examiner—Frank W. Lutter
Assistant Examiner—Vincent Gifford
Attorney—Alan Swabey

[57] ABSTRACT

Environment pollutants are treated by bringing them into contact with polyvinylpyrrolidone. Preferably, this substance is in a composition with a carrier material, preferably vermiculite. The composition may contain a nitrate of sulphate of copper or silver. Desirably, the composition is in the form of a self-supporting plaque which can form part of a pollution-controlling device. A preferred use of the invention is in treating gases resulting from the combustion of fuel containing pollutants. Devices are disclosed in which exhaust gases go through a passage in which they contact successive baffle members surfaced with pollutant-arresting material.

6 Claims, 8 Drawing Figures 3,757,489

INVENTOR
John EVANSHEN

ATTORNEY

INVENTOR
John EVANSHEN

ATTORNEY

POLLUTION CONTROL

BACKGROUND OF THE INVENTION

FIELD OF THE INVENTION

This invention relates to the treatment of environment pollutants.

More particularly, it concerns the treatment of hot exhaust gases, for example, gases from all types of internal combustion engines, smokestacks from buildings, or any hot exhaust emitting device, to prevent or substantially reduce the introduction of pollutants into the atmosphere.

A main object of the invention is to provide for treating pollutants contained in hot exhaust gases, to reduce their emission into the atmosphere, to form smog, reduce visibility, damage vegetation, or present health hazards.

A more specific object is to provide a method for treating the fumes of exhaust gases of motor vehicles to reduce the emission of atmospheric pollutants and smog-forming substances.

SUMMARY OF THE INVENTION

Having regard to the foregoing, the treatment of the invention employs, as treating agent, polyvinylpyrrolidone, with which the environment pollutant is brought into contact. Preferably, the polyvinylpyrrolidone is employed in the form of a composition along with a carrier substance, desirably vermiculite. The treating composition is, preferably, in the form of a solid mass, for example a plaque or biscuit. In the case of polyvinylpyrrolidone and vermiculite, the latter is present in an amount from about 5 percent to about 10 percent based on the total weight of the composition. The treating substance or substances may be supplemented by a material which further enhances the decontaminating action, for example, the nitrate or sulphate of copper or silver.

A preferred composition according to the invention is made by intimately mixing the vermiculite and polyvinylpyrrolidone in powder form, putting the mixture into a condition for making treating elements, and subjecting the mixture to the influence of oxygen, preferably in the form of air, so as to convert it to a solid mass. The mass can be made in various thicknesses, sizes and shapes, and subsequently made into plaques or other convenient forms for use as treating elements.

The invention also contemplates an apparatus of which the composition of the invention forms a part. For example, in such an apparatus treating elements, according to the invention, are suitably enclosed in a housing within which exhaust gases are forced into contact with them. This may be an elongated housing, forming a gas passage, and having inlet and outlet ends provided with an inlet and outlet respectively. There is support means in the housing and a succession of baffle means, surfaced with the pollution-arresting composition, are mounted on the support means, with bypasses to cause the gas to follow a circuitous path through the housing, while impinging on one baffle after the other.

BRIEF DESCRIPTION OF THE DRAWINGS

Having thus generally described the invention, it will be referred to in more detail, by reference to the accompanying drawings illustrating preferred embodiments, and in which.

DESCRIPTION OF THE PREFERRED EMBODIMENTS

Figure 1:
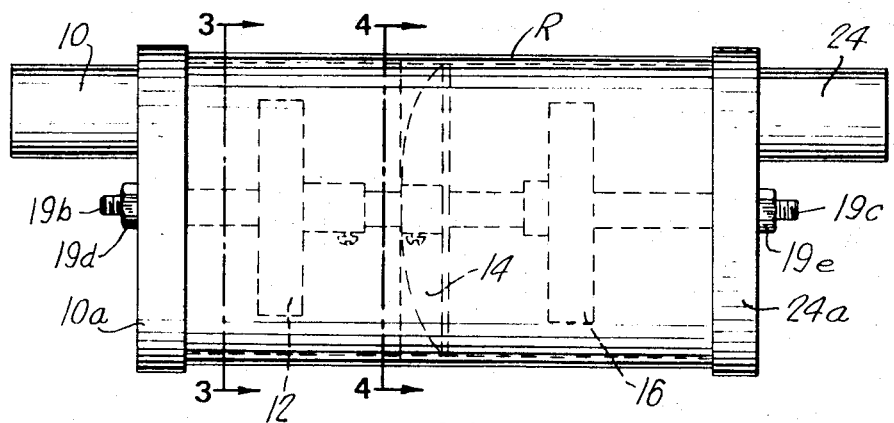
FIG. 1 is a side elevation of a typical motor vehicle exhaust filter according to the invention.

The drawing illustrates a motor vehicle, pollution control filter device mountable on the vehicle to receive exhaust gas from the engine. The device comprises a casing R, (in this instance cylindrical), inlet and outlet header plates 10a and 24a carrying an exhaust gas inlet pipe 10 and an exhaust gas outlet pipe 24 respectively. Replaceable elements 2, 6 and 9 in the form of plaques of pollution-arresting composition, preferably as described herein, are removably held in place on supporting plates 12, 14 and 16 mounted on a mounting tube 19 extending lengthwise of the casing R and carried on a rod 19a having threaded ends 19b and 19c carrying nuts 19d and 19e bearing against the header plates 10a and 24a respectively.

The baffle plates 12, 14 and 16 are specially shaped to hold the plaques, and at the same time, to provide for passage of the gases through the casing R. Take the plaque 12 for example. It has a flat body and a central hub 12d engaging the tube 19 on which it is set by a setscrew 12b. The plate 12 is made from a circular sheet bent to provide opposed flanges 12c and 12a and thus to leave openings 16a and 16b between the plate 12 and its edge abuts the flanges 12a and 12b. The plates 14 and 16 have similar parts and are similarly lettered. The central plate 14 is oriented so that its flanges are perpendicular to those of the plates 12 and 16 so that the gases passing through the openings 16a, b, 20a, b, and 21a, b, follow a circuitous path, from inlet to outlet, and in so doing are caused to impinge on the elements 12, 14 and 16.

The filter is easily assembled and dissembled, by reason of this construction, the header plates being demountable by removing the nuts 19d and 19e and the plates 12, 14 and 16 removable from the tube by loosening the set screws and sliding them off. The plaques can thus be easily replaced when they become overloaded with impurities.

The unit functions so that hot exhaust gases entering the inlet pipe 10 impinge on the element 2, the gases then pass through openings 16a, 16b, impinge on the element 6, pass through the opening 20a and 20b, impinge on the element 9, pass through the opening 21a and b and finally leave by the outlet pipe 24. In passing through the filter unit, the gases thus impinge, in turn, on the series of elements 2, 6 and 9, so that by the time the gases reach the outlet 24 they will have been substantially purified because of the special properties of the treating substance to attract pollutants from which the element is made.

The area of the passages 16a, b, 20a, b, and 21a, b, must be such that there is free passage of exhaust gases through the device without any pressure build-up. This will be so provided that the cross-sectional area available for the exhaust gas to pass through inside the main cylinder is never less than that of the intake pipe.

The elements 3, 6 and 9 are plaques or biscuits made of a solid composition, which is an intimate mixture of vermiculite and polyvinylpyrrolidone with the vermiculite present in an amount from about 4 percent to about 10 percent based on the total weight of the composition. The composition may contain from about 2-½ to about 10 percent by weight of a nitrate or sulphate of copper, platinum or silver, which enhances the activity of the other components.

Polyvinylpyrrolidone is described in *G.A.F. Corporation Technical Bulletin* 7543-113, the disclosure of which is incorporated by reference. As the Bulletin states, powders of polyvinylpyrrolidone are available under the names PVK-15 (having an average molecular weight of 10,000), PVK-30 (having an average molecular weight of 45,000), and PVK-90 having an average molecular weight of about 350,000. The applicant prefers to use "PVK-30."

Vermiculite is described as a mineral of the mica group, but hydrated, and with the property of expanding six to 20 times the volume of the unexpanded mineral when heated to about 2000°F. It is a hydrated magnesium-aluminum-iron silicate containing approximately 39% $SiO_2$, 21% $MgO$, 15% $Alhd\ 2O_3$, 9% $Fe_2O_3$, 5-7% $K_2O$, 1% $CaO$, 5-9% $H_2O$ and small quantities of Cr, Mn, P, S, Cl. The free oxides as such do not exist in the vermiculite crystals. Platelet-type crystalline structure; high porosity; high void volume to surface area ratio; low density; relative chemical inertness; large range of particle size; insoluble in water and organic solvents; water vapor adosorption capacity of expanded vermiculite less than 1 percent, liquid adsorption dependent on conditions and particle size, ranges 200-500 percent. It comes in the grades of unexpanded (ore concentrate), expanded (also called exfoliated); flake; activated. The applicant prefers to employ the unexpanded form in making this composition. The particle size of the vermiculite may vary from about five thousands of an inch to about one-sixteenth of an inch. The starting polyvinylpyrrolidone is in the form of a fine powder.

Figure 2:
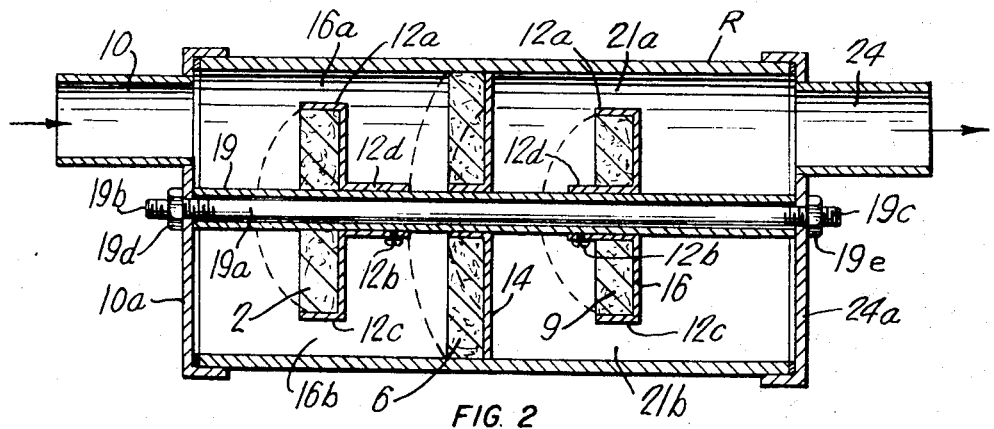
FIG. 2 is a horizontal cross section along the line 2—2 of FIG. 1.
Figure 3:
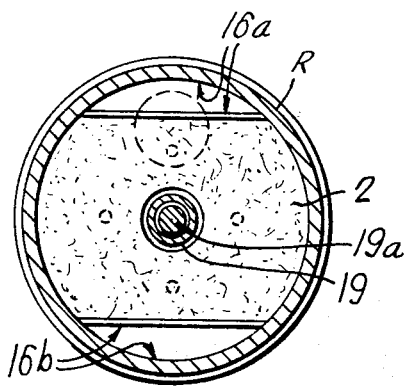
FIG. 3 is a vertical cross section along the line 3—3 of FIG. 1.
Figure 4:
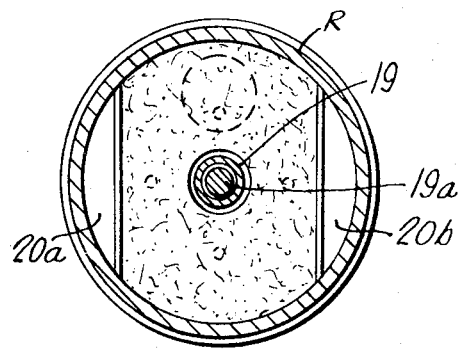
FIG. 4 is a vertical cross section partially in elevation along the line 4—4 of FIG. 1.
Figure 5:
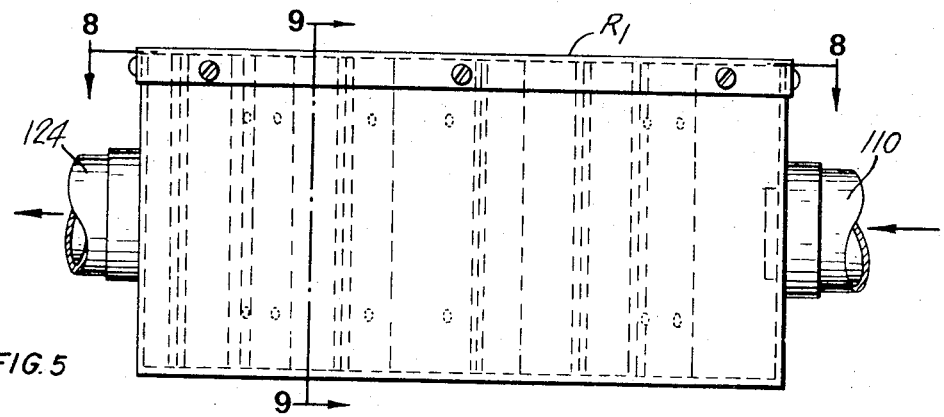
FIG. 5 is a side elevation of an alternative form of motor vehicle exhaust filter according to the invention.
Figure 6:
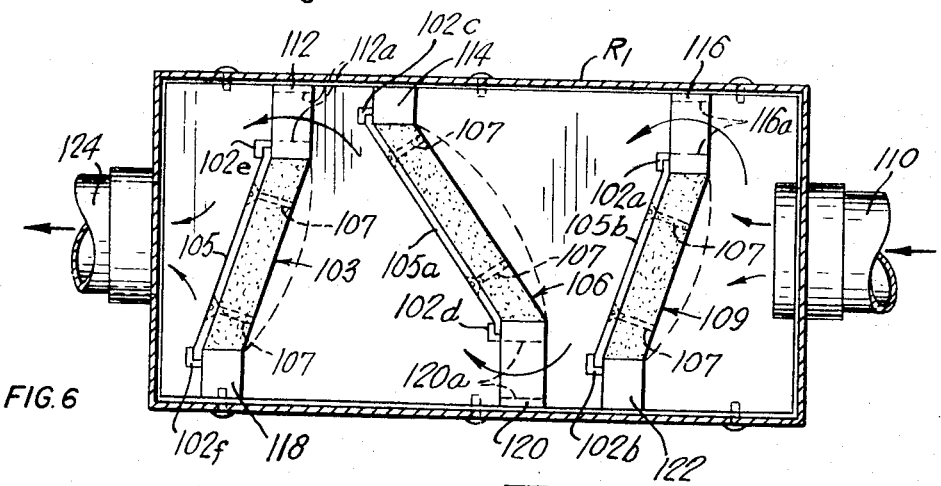
FIG. 6 is a horizontal cross section along the line 8—8 of FIG. 5.
Figures 7, 8:
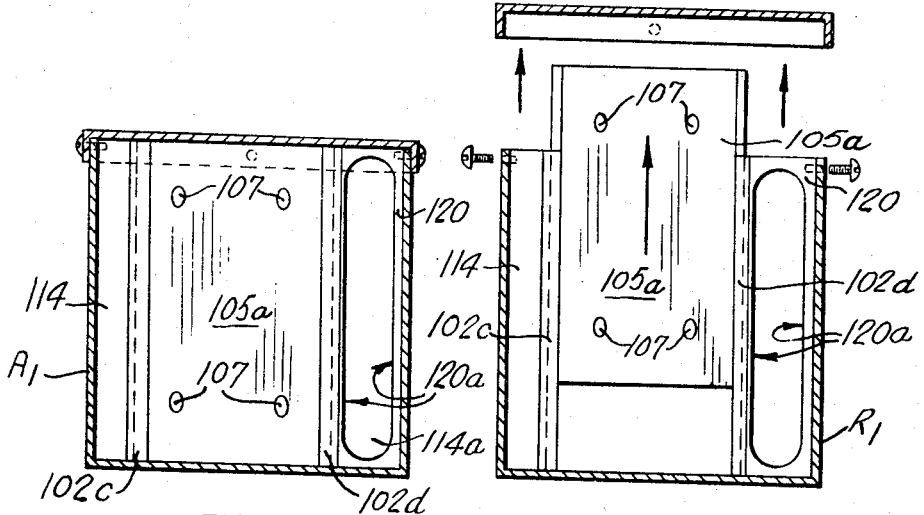
FIG. 7 is a vertical cross section along the line 9—9 of FIG. 5.
FIG. 8 is a vertical cross section similar to FIG. 7 with the cover removed and the filter element partly removed.

An alternative form of motor vehicle exhaust filter apparatus is shown in FIGS. 5 through 8. To facilitate reference to these figures, the different parts have been identified by similar digits and tens, but the corresponding reference numerals have been raised by 100. For example, a part in FIGS. 1 to 4 illustrated by 6 would be shown in FIGS. 5 to 8 as 106.

In the alternative form of the invention as shown in FIGS. 5 through 8, as in the previous form, there is provided a housing R1, which in this case, is rectangular. An inlet pipe 110 is connected to one end of the housing and an outlet pipe 124 to the other. Between the inlet and outlet are respective filtering elements 109, 106 and 103. Each filtering element is each carried on a mounting plate removably related to the housing R1. Considering the element 106 as typical, the construction is as follows. To one side of the casing R1 is attached the bracket 120. Projecting from the bracket 120 is a slide 102d. Diagonally opposite, extending inward from the other wall of the housing R1 is a bracket 114 provided with a slide 102c. Having Mounted between the slides 102c and 102d is the metal plate 105b, on which the plaque 106 is mounted and held by screws 107. The bracket 116 is provided with an opening 114a to permit passage of gases towards the next filtering element. Having described the mounting of the element 106, that of the companion elements 103 and 109 will be clear. For example, the element 103 is mounted on the plate 105 engaging the slides 102f and 102e on the brackets 118 and 112 respectively, extending from the housing R1. The element 109 is mounted on the plate 105b, engaging the slides 102b and 102a, mounted on the brackets 122 and 116, respectively, extending from the housing R1.

The device works as follows. Exhaust gas is forced into the pipe 110 from an internal combustion engine and first impinges on the element 109 which baffles it and forces it to follow a circuitous path through the opening 116a. The gas then impinges on the element 106 and then through the opening 120a in the bracket 120 to impinge on the element 103 and then to pass through the opening 112a of the bracket 112, then to the outlet pipe 124. The impingement of the gas on the respective filtering elements in return causes the pollutants to be extracted and remain in the elements. The elements may be removed by sliding their mounting plates out of the slides provided for this purpose so that when loaded with pollutant, they can be replaced by new filtering elements.

Since certain changes and modifications may be made in the above process, compositions and products, without departing from the scope of the invention, it is intended that all matter contained in the above description or shown in the accompanying drawing, shall be interpreted as illustrative and not in a limiting sense. Therefore only such limitations as indicated in the appended claims should be imposed.

I claim:

1. A method of treating environment pollutants, comprising, bringing pollutants contained in hot gases produced by the combustion of a fuel into contact with a solid composition containing polyvinylpyrrolidone.

2. A method, as defined in claim 1, in which the solid composition contains polyvinylpyrrolidone and a carrier substance.

3. A method, as defined in claim 2, in which the carrier substance is vermiculite.

4. A method, as defined in claim 3, in which the vermiculite is present in an amount from about 5 percent to about 10 percent by weight of the total composition.

5. A method, as defined in claim 1, in which the composition contains a nitrate or sulphate of copper or silver.

6. A method, as defined in claim 1, in which the composition is in the form of a self-supporting plaque.

* * * * *